UNITED STATES PATENT OFFICE.

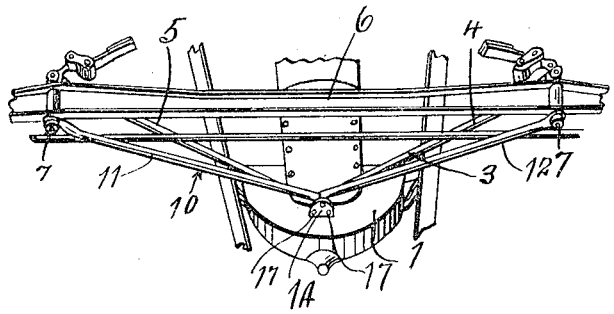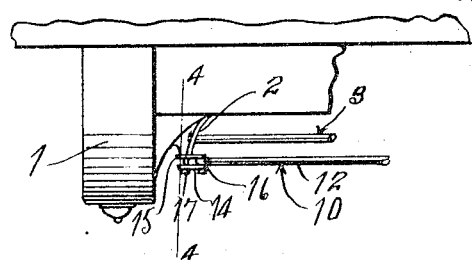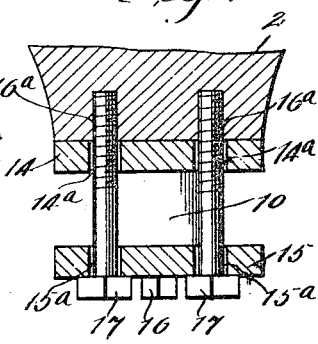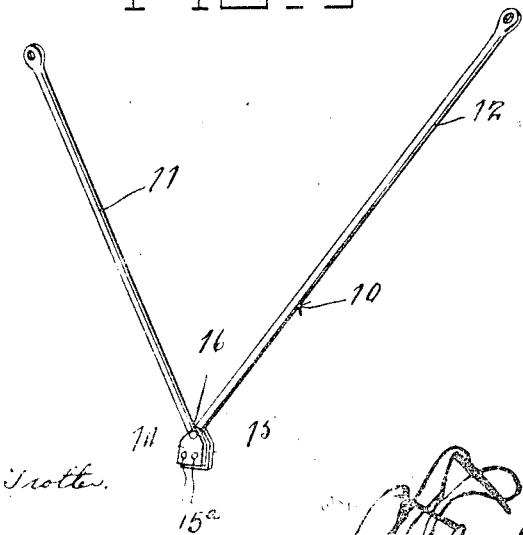

WILLIE E. HOUGAS AND LEONARD J. MIDGORDEN, OF LAMONI, IOWA.

AUXILIARY RADIUS-ROD.

1,230,713.  Specification of Letters Patent.  Patented June 19, 1917.

Application filed April 13, 1914. Serial No. 831,682.

*To all whom it may concern:*

Be it known that we, WILLIE E. HOUGAS and L. J. MIDGORDEN, citizens of the United States, residing at Lamoni, in the county of Decatur and State of Iowa, have invented certain new and useful Improvements in Auxiliary Radius-Rods, of which the following is a specification.

This invention relates to attachments for automobiles and more particularly to an auxiliary radius rod for use upon a pleasure automobile commercially known as a Ford.

The primary object of this invention is the provision of an auxiliary radius rod for attachment to an automobile, for strengthening the front axle of the automobile, eliminating the liability of breakage to the radius rod proper, increasing the longevity of the car and rendering the car more serviceable for rough or heavy usage.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, and in which:—

Figure 1 is a perspective view of a fragment of the bottom of an automobile showing the auxiliary radius bar attached thereto.

Fig. 2 is a side elevation of a portion of an automobile showing the manner of attaching the auxiliary radius bar thereto, Fig. 3 is a perspective view of the auxiliary radius bar, and Fig. 4 is an enlarged vertical sectional view taken on the line 4—4 of Fig. 2.

Referring more particularly to the drawings, 1 designates the casing of the engine used for the propulsion of the vehicle a fragment of which is shown in Figs. 1 and 2, which casing has depending therefrom a lug 2. The lug 2 is positioned forwardly of the fly wheel retaining portion of the casing and it has attached thereto the ordinary radius rod 3, which radius rod has its arms 4 and 5 extending forwardly from the lug 2 to the front axle of the vehicle where they have their terminal ends connected to the bolts 7, which extend through the axle 6.

The auxiliary radius rod 10 has arms 11 and 12 converging and welded together as is clearly shown in Fig. 3 of the drawings, to which converging ends plates 14 and 15 are secured by any suitable fastening means such as a bolt or rivet 16. The plates 14 and 15 are provided with oppositely disposed openings 14ᵃ and 15ᵃ having extending transversely therethrough bolts 17, which bolts are spaced for insertion into the screw threaded holes 16ᵃ formed in the lug 2, which holes are formed in the construction of the car and not especially for the attachment of the plates 14 and 15 thereto. The arms 11 and 12 have their free terminal ends flattened and provided with openings extending therethrough, and the arms radiate from their converging ends approximately parallel to the radiation of the arms 4 and 5 of the radius bar 3, and they are mounted upon the bolt 7, upon the opposite sides of the axle 6 from the sides upon which the ends of the arms 4 and 5 of the radius rod 3 are attached. The auxiliary radius rod 10 tends to strengthen the vehicle and brace the radius rod 3 thereby rendering more positive and steady the movement of the axle 6 in guiding of the vehicle and materially increasing the longevity of this portion of the automobile.

In reducing the invention to practice certain minor features of construction, combination and arrangement of parts may necessitate alterations to which the patentee is entitled provided such alterations are comprehended within the scope of what is claimed.

What is claimed is:—

1. The combination with an automobile embodying an engine casing and a front axle, and a V-shaped radius rod secured at its apex to said casing and extending forwardly therefrom to said axle, of an auxiliary V-shaped radius rod secured at its apex to said casing and extending forwardly therefrom to said axle, the forward ends of said first radius rod being located above the axle and the corresponding ends of said auxiliary radius rod being located below said axle, the ends of one radius rod being alined with the ends of the other rod, and a bolt engaging each pair of alined ends and the axle to secure all of said ends to the axle.

2. In combination with an automobile embodying an engine casing having a downwardly depending lug with screw-threaded openings, and a front axle, and a V-shaped radius rod secured at its apex to said lug and extending forwardly therefrom to said axle, of an auxiliary V-shaped radius rod, a pair of spaced plates secured to the apex of the auxiliary V-shaped radius rod and having openings therein, bolts extending through the openings and threaded into the openings of the lug for securing the apex of the auxiliary radius rod to the lug, the forward ends of said first radius rod being located above the axle and the corresponding ends of said auxiliary radius rod being located below said axle, the ends of the radius rod being alined with the ends of the other rod, and a bolt engaging each pair of alined ends and the axle to secure all of said ends to the axle.

In testimony whereof we affix our signatures in presence of two witnesses.

WILLIE E. HOUGAS.
LEONARD J. MIDGORDEN.

Witnesses:
JOHN MIDGORDEN,
FLOYD RICHARDSON.